(12) United States Patent
Nakamura et al.

(10) Patent No.: US 6,384,884 B1
(45) Date of Patent: May 7, 2002

(54) REFLECTING TYPE LIQUID CRYSTAL DISPLAY DEVICE

(75) Inventors: Takashi Nakamura, Saitama-ken; Yuzo Hisatake, Kanagawa-ken; Nozomu Harada, Kanagawa-ken; Kazushi Miyake, Kanagawa-ken, all of (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/280,998

(22) Filed: Mar. 30, 1999

(30) Foreign Application Priority Data

Mar. 30, 1998 (JP) .......................................... 10-083819

(51) Int. Cl.$^7$ ........................................... G02F 1/1335
(52) U.S. Cl. ..................... 349/113; 349/112; 349/86; 359/599
(58) Field of Search ........................... 349/112, 86, 113; 359/599

(56) References Cited

U.S. PATENT DOCUMENTS

| | | | | |
|---|---|---|---|---|
| 4,579,423 A | * | 4/1986 | Fergason | 349/86 |
| 5,004,785 A | * | 4/1991 | Ida et al. | 525/305 |
| 5,331,446 A | * | 7/1994 | Hirai et al. | 359/51 |
| 5,548,670 A | * | 8/1996 | Koike | 385/27 |
| 5,731,858 A | * | 3/1998 | Hisatake et al. | 349/112 |
| 5,767,935 A | * | 6/1998 | Ueda et al. | 349/112 |
| 5,940,211 A | * | 8/1999 | Hikmet et al. | 359/490 |
| 6,010,747 A | * | 1/2000 | Beeson et al. | 427/162 |
| 6,288,172 B1 | * | 9/2001 | Goetz et al. | 525/200 |

FOREIGN PATENT DOCUMENTS

JP 2-221926 9/1990

OTHER PUBLICATIONS

Nishimura et al., The Performance of a Liquid–Crystal as an Optical Compensator for a Fast–Response STN–LCD, May 1995, SID Digest, p. 568.*

* cited by examiner

Primary Examiner—Kenneth Parker
Assistant Examiner—David Chung
(74) Attorney, Agent, or Firm—Pillsbury Winthrop

(57) ABSTRACT

Light diffusion layer 12, which diffuses reflected light by a reflecting surface, is arranged on a reflecting type liquid crystal display device having at least 2 substrates 24 and 29, liquid crystal layer 30 inserted between these substrates, and reflecting surface 16a which reflects light via this liquid crystal layer.

This light diffusion layer forms a fine particle dispersion layer or a diffraction grating layer combined of 2 types of refractive index medium with differing refractive indices, and when the refractive index of first refractive index medium 13 is nA(400) at light wave length 400 nm, and nA(700) at light wave length 700 nm, and the refractive index of second refractive index medium 14 is nB (400) at light wave length 400 nm, and nB(700) at light wave length 700 nm, then, $$(nA(400)/nA(700)) \times 0.9 \leq (nB(400)/nB(700)) \leq (nA(400)/nA(700)) \times 1.1.$$

5 Claims, 5 Drawing Sheets

$\theta_p \propto \theta_\alpha$ $\theta_p \propto n_2/n_1$ $\theta_\alpha = \sin^{-1}\left(\dfrac{n_2}{n_1}\sin\theta_0\right)$ (Snell's Law)

$$\theta m = \sin^{-1}(m\lambda/p)$$

$$Im \propto \left(\frac{2}{\pi}\right)^m \sin^2\left(\frac{|n_1 - n_2| \cdot d\pi}{\lambda}\right)$$

REFLECTING TYPE LIQUID CRYSTAL DISPLAY DEVICE

BACKGROUND OF THE INVENTION

1. Field of the Invention

The present invention relates to a reflecting type liquid crystal display device.

2. Description of the Prior Art

Recently, liquid crystal display devices have been applied to various fields such as notebook type personal computers, monitors, car navigation, scientific electronic calculators, small and medium size TVs, etc. Among these, investigations into reflecting type liquid crystal display devices are being carried out, in order to take advantage of their low energy consumption due to not requiring a backlight, as well as their thinness and light weight for applications in displays for portable devices.

In reflecting type liquid crystal display devices, apart from the TN mode display mode which uses 2 polarizing plates, there are three main types of display modes; GH (Guest Host) mode, high molecular dispersion mode, and single polarizing plate mode.

The GH (Guest Host) mode has the special characteristic of being able to obtain a bright display due to relatively low light absorption. However, there is the disadvantage that, as the two-color ratio of the material cannot be adequately obtained, the contrast is low. The high molecular dispersion mode has the special characteristic of having a wide angle of visibility due to achieving satisfactory light diffusion. However, it has the disadvantage of low reflectance and contrast, and is not yet ready for practical use. Although the single polarizing plate mode has light absorption due to the polarizing plates and is unable to obtain satisfactory brightness, high contrast can be obtained as it uses polarizing plates, and it is becoming the main reflecting type color liquid crystal display device in current use.

An example of the single polarizing plate mode, seen from the observer side, is composed of a polarizing plate, a glass substrate, a drive liquid crystal formed from spirally orientated chiral nematic liquid crystal, a glass substrate, a reflecting plate and reflecting electrode. Both polarizer and analyzer functions are obtained by the incidents light's making two transits of the liquid crystal layer and the polarizing plate when incoming and outgoing via the reflecting layer. For this reason, compared to the reflecting type TN mode which uses 2 polarizing plates and which is used in conventional calculators and watches and the like, by reducing the number of polarizing plates by 1, it has the special characteristics of having brightness and in addition, by using polarizing plates it has the same control effect and satisfactorily high contrast.

In addition, the surface of the reflecting layer of this kind of single polarizing plate mode is formed from a bumpy reflecting plate which has the function of diffusing and reflecting light, or a completely regular reflecting flat metal reflecting surface. With the former bumpy reflecting surface it is possible to obtain a simultaneous light diffusion function and a reflecting function, however, as the polarized state of the entering light is altered at the reflecting surface by the bumps, there is the problem of reduced contrast with the single polarizing plate mode construction which requires maintenance of the polarized state at the reflecting surface.

On the other hand, in the case of a flat metal reflecting surface which obtains regular reflection, although a separate light diffusing light diffusion layer is required, there is no polarizing break down, and it has the special characteristic of achieving high contrast. The characteristics of reflected light with this kind of speculum reflecting surface, comprising a light diffusion layer, depend on the light diffusion layer. In the past for this light diffusion layer there were, for example, mat system anticlear processing of polarizing plates, and a diffraction grating film arrayed so that a refractive index medium having refractive index anisotropy distributes the refractive index two-dimensionally. However, these light diffusion effects have strong wavelength dispersion characteristics, and when the light source is in an environment relatively near to parallel, the reflected light has a yellowish coloring in the regular reflection direction of the light source, and conversely in the direction receding away from the regular reflection direction, there is the problem of bluish coloring. The reason for this is that the light diffusion effect becomes stronger the shorter the wavelength of the wavelength dispersion characteristics of the light diffusion effect of the light diffusion layer.

In this way, in a reflecting type liquid crystal display device formed from a construction of a speculum reflecting layer and a light diffusion layer in a single polarizing plate mode, as wavelength dispersion characteristics of the light diffusion effect of the light diffusion layer are present, there was the problem of coloring of the reflected light. This type of problem is not limited to the single polarizing plate mode, but is an inevitably occurring problem in reflecting type liquid crystal display devices that use a light diffusion layer.

In conventional reflecting type liquid crystal displays, the direction of the surface reflection in the panel display and the largest reflecting strength direction of the reflecting surface correspond, and in practice, the visibility from the brighter looking direction was extremely low.

SUMMARY OF THE INVENTION

One object of the present invention is to provide a simple construction reflecting type liquid crystal desplay device and to realize a low cost device with the characteristic of the largest reflecting strength direction of the reflecting surface coming in a viewing angle direction from which the surface reflection cannot be seen.

According to an aspect of the reflecting type liquid crystal display device of the invention, the device having at least two substrates, a liquid crystal layer sandwiched between these substrates, a reflecting surface which reflects light passing through this liquid crystal layer, and a light diffusion layer which at least diffuses the light reflected by that reflecting surface, wherein the light diffusion layer is formed of 2 types of refractive index medium with differing refractive indices, and when the refractive index of the first refractive index medium is nA(400) at light wave length 400 nm, and nA(700) at light wave length 700 nm, and the refractive index of the second refractive index medium is nB(400) at light wave length 400 nm, and nB(700) at light wave length 700 nm, then, $$(nA(400)/nA(700)) \times 0.9 \leq (nB(400)/nB(700)) \leq (nA(400)/nA(700)) \times 1.1 \quad (1)$$

By the above construction, the wavelength dispersion of the light diffusion effect is reduced.

Further, in the aforementioned, the light diffusion layer is constructed of a fine particle dispersion layer in which fine particles of the second refractive index medium are dispersed in the first refractive index medium, or of a diffraction grating layer in which the first refractive index medium and the second refractive index medium are alternately arranged having regularity in a surface direction.

The light diffusion effect of the light diffusion layer mainly depends on the light diffusion effect and on the light diffraction effect due to the refractive index difference of the 2 types of refractive index medium.

FIG. 2 shows the principle of a case using this kind of light refraction effect. As in FIG. 2a, when medium n1 of refractive index n1 and medium n2 of refractive index n2 are combined, refraction occurs according to the ratio of the 2 types of refractive index. When the degree of this refraction is represented as an angle of refraction, in accordance with Snell's law, it becomes as in FIG. 2b. Here, θo is the angle of incidence and θp is the final outgoing angle. Here, when the wave length dispersion characteristic of the ratio n1/n2 of n1 and n2 is large, the aforementioned coloring problems occur because the degree of refraction differs according to the wavelength of the incident light. So that the wavelength diffusion characteristics of these 2 types of refractive index come within the ranges of Formula (1), 400 nm is the short and 700 nm is the long wavelength visible light range, and when nA(400)/nA(700), which is the refractive index ratio of the first refractive index medium near both ends of visible light, is the same as or approaching nB(400)/nB(700), which is the refractive index ratio of the second refractive index medium, as θp becomes constant, wavelength dispersion due to refractive index difference is reduced. By selecting the materials of the refractive index media, the coloring of reflected light can be suppressed to a range where it is practically not a problem.

On the other hand, the light diffusion principle in the case of a diffraction grating system is shown in FIG. 3. In diffraction, when 2 types of refractive index medium, n1 and n2, are alternately arranged in a surface direction and light passing through this layer passes through each of the refractive index media, a phase difference occurs, and this phase difference causes interference of the light, thus creating diffraction and diffusing the light. First order, second order, third order, . . . diffracted light occurs, according to the order of interference of the diffracted light. The direction of travel of each of the orders (in the drawing θm (m=1, 2, 3, . . . )) depends on the refractive index distribution pitch and the incident light wavelength. Here, Im is light intensity of m order, m is the order, λ is the light wavelength, p is the grating pitch and d is the thickness.

Also, the light intensity of each order depends on the refractive index difference (|n1−n2|) of the refractive index media, the layer thickness of the refractive index media and the wavelength of the incident light. Consequently, the wavelength dispersion of the light scattering intensity depends on the refractive index difference of the refractive index media. Here, the aforesaid coloring problem occurs because the degree of refraction differs according to the wavelength of the incident light when the wavelength dispersion characteristic of (|n1−n2|) is large.

From these facts, by selecting the materials of the refractive index media so that the wavelength diffusion characteristics of these 2 types of refractive index come within the range of Formula (1), the coloring of reflected light can be suppressed to a range where it is practically not a problem.

Furthermore, the present invention is a reflecting type liquid crystal display device in which the reflecting surface is a speculum, and which is provided with a light diffusion layer on the light incidence side of that reflecting surface.

The surface of the said reflecting layer is a reflecting surface that is a speculum and makes metallic reflections, and if it is of a construction provided with a light diffusion layer having a function which diffuses incident light from the said reflecting surface, that is to say, it reflects light entering to the observation (observer) side, high contrast can be obtained since the polarized state of the incident light at the reflecting surface is reflected in a maintained form. Thus, better performance can be obtained with a combined light diffusion layer and reflecting layer than with a construction using a bumpy reflecting plate.

Furthermore, the present invention is a reflecting type liquid crystal display device wherein the reflecting layer is located further to the observation side than the substrate located at the rear as seen from the observation side of the 2 substrates.

By positioning the location of the said reflecting layer to the immediate rear of the liquid crystal layer, that is to say on the observer's side of the liquid crystal substrate that is positioned to the very rear as seen from the observer's side (at the front), ghosting does not occur on the display and a satisfactory display can be obtained, as parallax caused by the said substrate positioned at the very rear does not occur.

By using these means, the coloring of reflected light can be significantly improved compared with the past. However, to achieve a more achromatic coloring, corrections by adjusting the wavelength dispersion of the transmittance of parts such as color filters, polarizing plates and phase difference plates can be performed.

When correcting using color filters and phase difference plates, as it is necessary to suppress color device transmittance to the same coloring as that of the said light diffusion layer, the overall transmittance is lowered by the correction.

Therefore, the said liquid crystal display device of the present invention has, in addition, the special characteristic that when more than 1 polarizer is used and the refractive indices of the refractive index media of the light diffusion layer are $$|nA(400)-nB(400)| \geq |nA(700)-nB(700)|,$$

the chromaticity when 2 polarizers are parallel-arranged is $a^*<0, b^* \leq 0$, and when $$|nA(400)-nB(400)| \leq |nA(700)-nB(700)|,$$

the chromaticity of the said 2 parallel-arranged polarizers is $a^*>0, b^* \geq 0$.

By this construction further improvements have been made and achromatic coloring of the display enhanced.

This is because the transmittance of the color device corresponding to the complementary color of the coloring of the aforesaid light diffusion layer has been heightened by weakening the degree of polarization.

Moreover, chromaticity $a^*, b^*$ denotes the $L^*a^*b^*$ (CIELUV color space) coordinates of a uniform color space denoting chrominance perceived as of equivalent size, including cases where luminance differs, by expanding the UCS chromaticity diagram that displays chrominance to three dimensions. The said chromaticity range represents a coordinate domain of a coordinate plane with $a^*$ as the horizontal axis and $b^*$ as the vertical axis.

Furthermore, the present invention can be formed of a light dispersion layer and a high molecular liquid crystal. This is particularly advantageous when producing a diffraction grating layer. In this case, the refractive index anisotropy of 1 type of a high molecular liquid crystal is used to form what appear to be 2 types of refractive index medium. For example, domains are formed of a plurality of stripes or the like in the surface direction, and by changing the array direction of the liquid crystal molecules for each of the neighbouring domains, refractive index differences are imparted between the stripes. However, in this case, as the refractive index difference has polarity, it is necessary to select so that the difference becomes larger in the direction in which the light is particularly wanted to be diffused.

BRIEF DESCRIPTION OF THE DRAWINGS

FIG. 2a is a model sectional view, and FIG. 2b is a schematic view illustrating refraction;

FIG. 4a is a sectional schematic view, FIG. 4b is a schematic sectional view of a light diffusion layer, and FIG. 4c is a schematic plan view;

DESCRIPTION OF THE PREFERRED EMBODIMENTS

[Embodiment 1]

Figure 1:
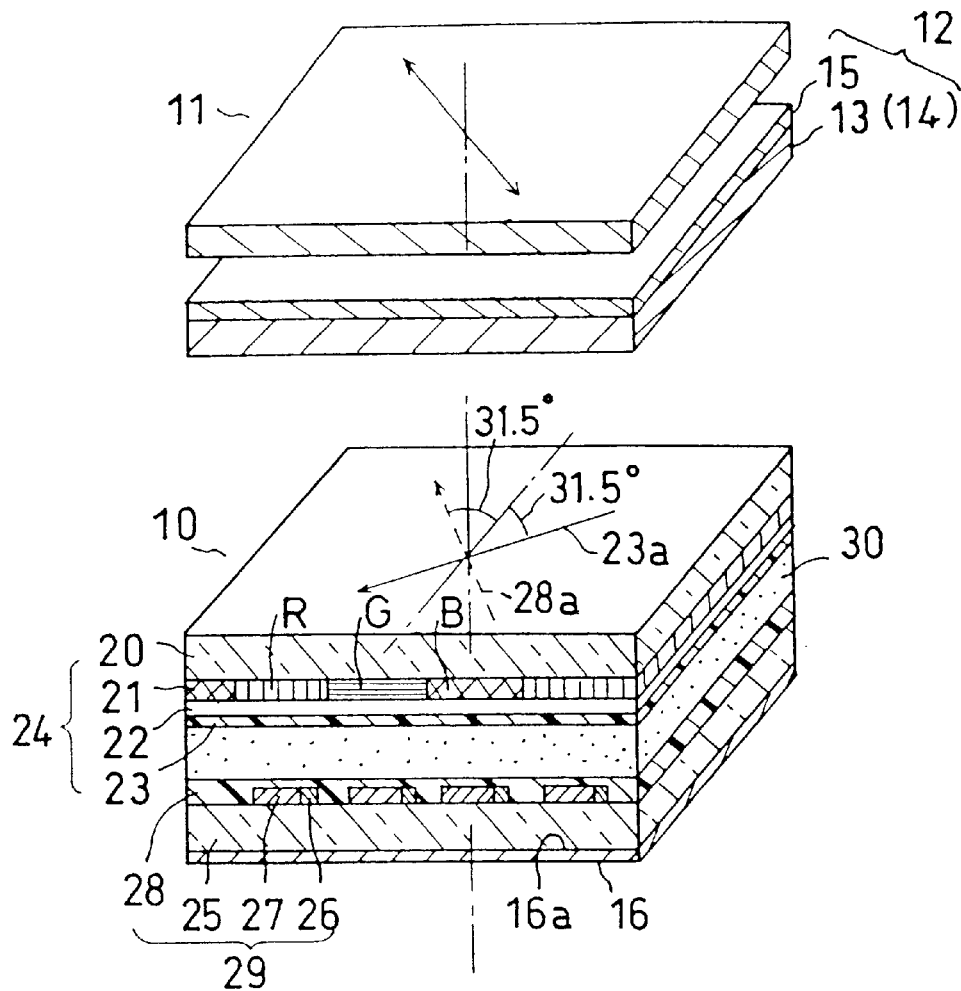
FIG. 1 is an exploded perspective view showing a model of a first embodiment of the present invention.

In FIG. 1, one polarizer 11 is positioned on the observer side (front side) of reflecting type liquid crystal cell 10, and, light diffusion layer 12 is positioned between cell 10 and polarizer 11. Furthermore, reflecting layer 16, having reflecting surface 16a, is arranged to the rear of cell 10.

Figure 2A:
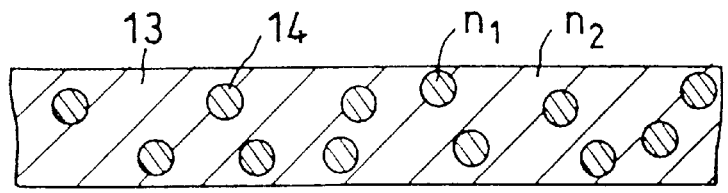
FIG. 2a through FIG. 2b are diagrams illustrating the light diffusing layer of a first embodiment.
Figure 2B:
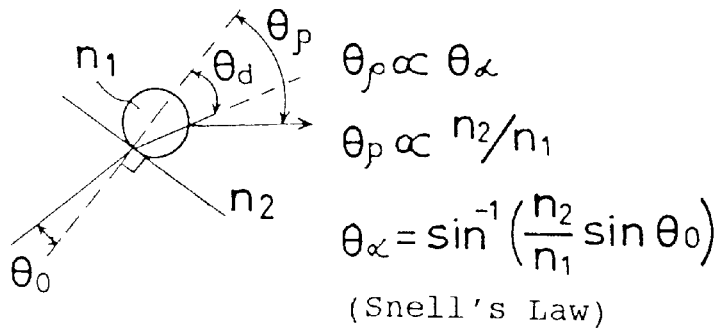
Figure 3:
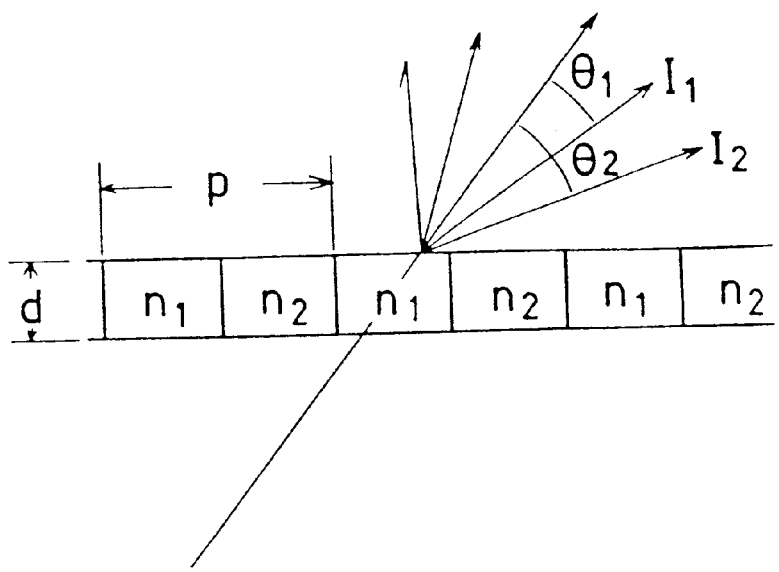
FIG. 3 is a schematic view illustrating a phase diffraction grating.

Light diffusion layer 12 is formed as follows. Referring to FIG. 2a, polystyrene of grain size of less than 1 μm, which is second refractive index medium 14, is dispersed by an emulsion method in a binder polysulphone, which becomes first refractive index medium 13, melted in an alcohol solvent. This is spread at a thickness of 30 μm on TAC film 15 that has no phase difference and is 50 μm thick, and forms a fine particle dispersion layer of fine particles, formed of polystyrene, dispersed in a laminated body formed of a polysulphone base material. The fine particle diffusion density of this fine particle dispersion layer is 0.3 wt. %. This has the function of reducing the incident light by half and diffusing the light by ±30°, when light is reciprocated.

The refractive index of the said first refractive index medium is 1.55 at light wavelength 400 nm, and the ratio of refractive index nA(400) of light wavelength 400 nm and light refractive index nA(700) of light wavelength 700 nm is nA(400)/nA(700)=1.12. In regard to this, the refractive index of dispersed fine particle polystyrene 14 is 1.50 at light wavelength 400 nm (refractive index nB(400), and the ratio with refractive index nB(700) of light wavelength 700 nm is nB(400)/nB(700)=1.12.

Therefore, the refractive index difference wavelength dispersions of the 2 types of medium are equal, and there is hardly any wavelength dispersion in these light diffusion layers.

Next, an explanation will be given of reflection type liquid crystal cell 10. Firstly, as shown in FIG. 1, color filter 21 comprised of the three colors of red R, green G, and blue B is, formed on substrate 20, which is formed of 0.7 mm thick glass. Counter electrode 22 is formed on this by producing an ITO film of thickness 2000 Å (Angstroms). Then, poly- imide is printed and baked in the effective display domain and then rubbed, as orientation film 23, to form counter substrate 24.

Next, on substrate 25 formed of 0.7 mm thick glass, gate line electrode formed of MoW, signal line electrode formed of Mo/Al/Mo, auxiliary capacitance Cs electrode formed of MoW (not illustrated) and TFT device 26 form picture element electrode 27. Next, polyimide is printed and baked in the effective display domain as orientation film 28, and is rubbed in a direction orientated at an angle of 63° opposite to orientation treatment direction 23a of counter substrate 24 to form orientation treatment direction 28a, in order to obtain matrix array substrate 29.

Next, said counter substrate 24 and array substrate 29 are held maintained at a space of, for example 3 μm, and into this space liquid crystal (ZLI1695, manufactured by Merck Japan (K.K.)) with 0.07 wt. % added chiral (S811, manufactured by Merck Japan K.K.) is injected. In this way, drive liquid crystal layer 30 is obtained.

At this time, it is desirable that drive liquid crystal layer 30 is formed so that a one-quarter wavelength phase difference is obtained on a one-way optical path.

Furthermore, elliptical polarizing plate 11 is laminated on diffusion layer substrate 15, and reflecting plate 16 is laminated on the bottom surface of substrate 25.

In this way, the first actual configuration of the present invention, for example, an 800×600 dot, 3-inch type liquid crystal display device is formed.

When using this actual configuration, a reflecting type liquid crystal display device without coloring caused by wavelength dispersion and with considerably improved visibility is obtained.

Figure 5A:
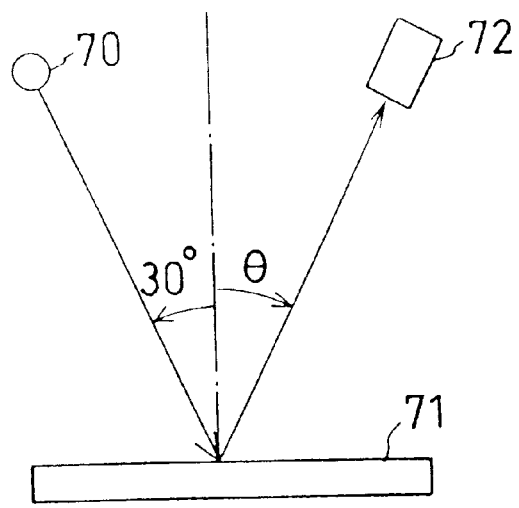
FIG. 5a through FIG. 5c are schematic views showing the system used to measure the chromaticity of the samples.
Figure 6:
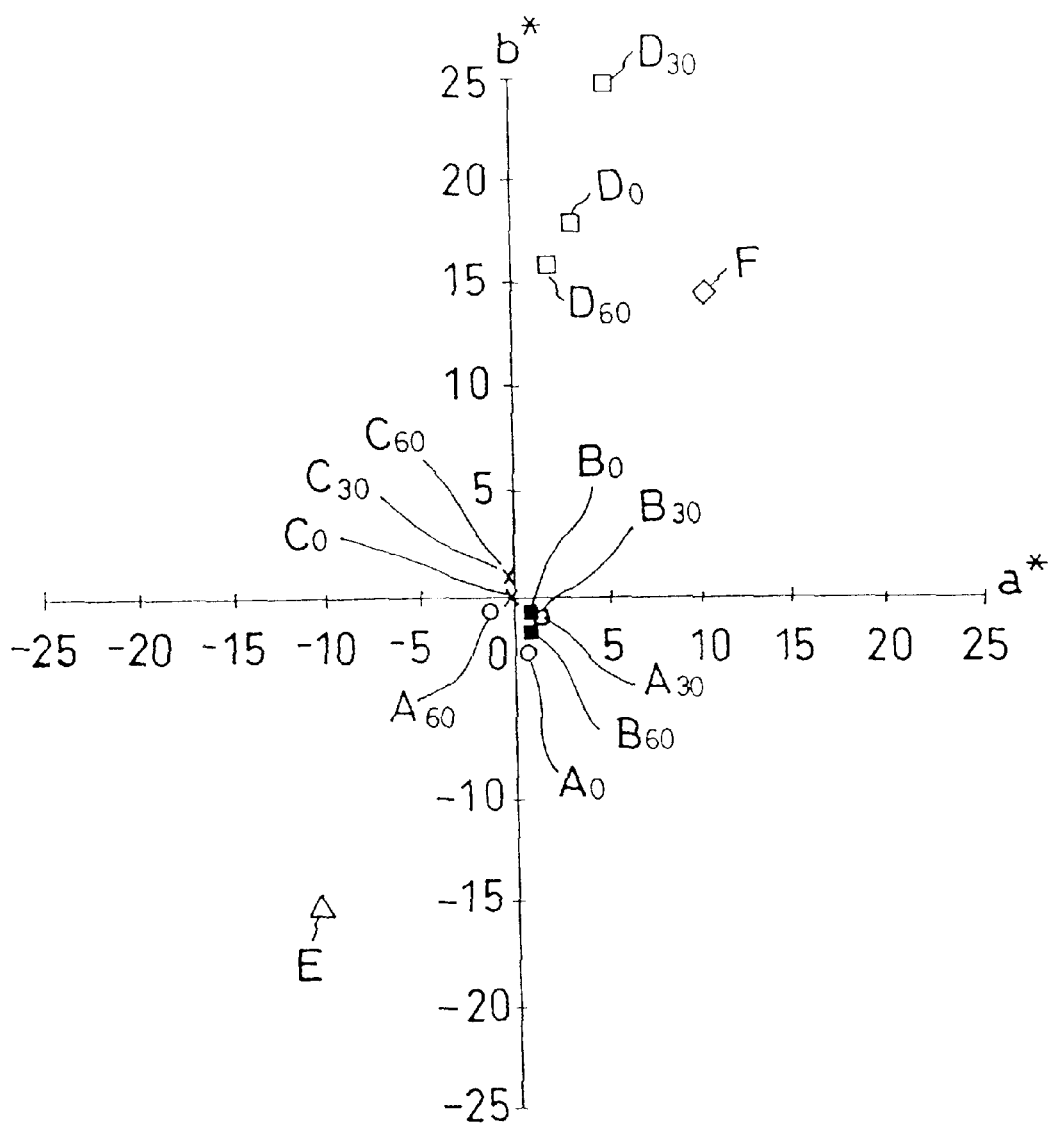
FIG. 6 is a graph of the coordinates a*, b*, showing the chromaticity of the present invention and a conventional device.

The chromaticity of liquid crystal cell (A) according to this actual configuration was measured by the system of measurement shown in FIG. 5a. Measurement results are shown in FIG. 6 and Table 1.

TABLE 1

| Sample | Measurement Direction (deg) | a* | b* |
|---|---|---|---|
| Embodiment 1 (Cell)(A) | 0 | 0.3 | -2.3 |
| | 30 | 1 | -1.3 |
| | 60 | -1 | -0.8 |
| Embodiment 2 (Cell)(B) | 0 | 0.6 | -1.5 |
| | 30 | 0.8 | -0.8 |
| | 60 | 0.9 | -1 |
| Embodiment 3 (Cell)(C) | 0 | -0.1 | 0 |
| | 30 | 0.3 | 0.5 |
| | 60 | -0.5 | 1 |
| Polarizing Plate (Parallel)(E) | 0 | -10.4 | -15 |
| Light Diffusion Layer (F) | 0 | 10.3 | 15 |
| Conventional Device (Cell)(D) | 0 | 2 | 16 |
| | 30 | 5 | 25 |
| | 60 | 3 | 18 |

Also, measurement results are shown for a conventional device, Sample (D), for which, apart from using conventional light diffusion plates of polystyrene dispersed in a PVA binder, the composition was the same as in the actual configurations.

When nPo is the refractive index of the conventional polystyrene light diffusion plate and nP is the PVA refractive index, then, $$nPo(400)-nP(400)=0.023,$$

and $$nPo(700)-nP(700)=0.016,$$

and the refractive index difference is as large as the short wavelength light. The shorter the wavelength of incident light that uses this as a diffusion plate, the stronger the diffusion.

In the measurement, as shown in FIG. 5a, white light source 70 of a color temperature of 8000K was provided at a 30° inclined direction from the normal direction of sample 71 and luminance meter 72 was provided in the opposite direction, and measurements were made at inclined angles θ of 0°, 30° and 60° from the normal direction of the sample. The regular reflectance direction of the light source is when the value of θ is 30°, and 0° and 60° are at 30° inclined directions from this regular reflectance direction.

In FIG. 6, in regard to each of θ=0, 30°, 60°, the values for the actual configuration are shown as A0, A30 and A60. It is the same with regard to actual configurations (B) and (C), and conventional device (D). The values for the parallel-arrayed polarizing plate and the value for the light diffusion plate are shown as (E) and (F) respectively.

As is made clear from FIG. 6, the cell of this actual configuration does not have any coloring at any angle. Compared to this, as can be understood from the values of D0, D30, D60 for the cell that used a conventional light diffusion plate, a yellow coloring is present.

[Embodiment 2]

Figure 4A:
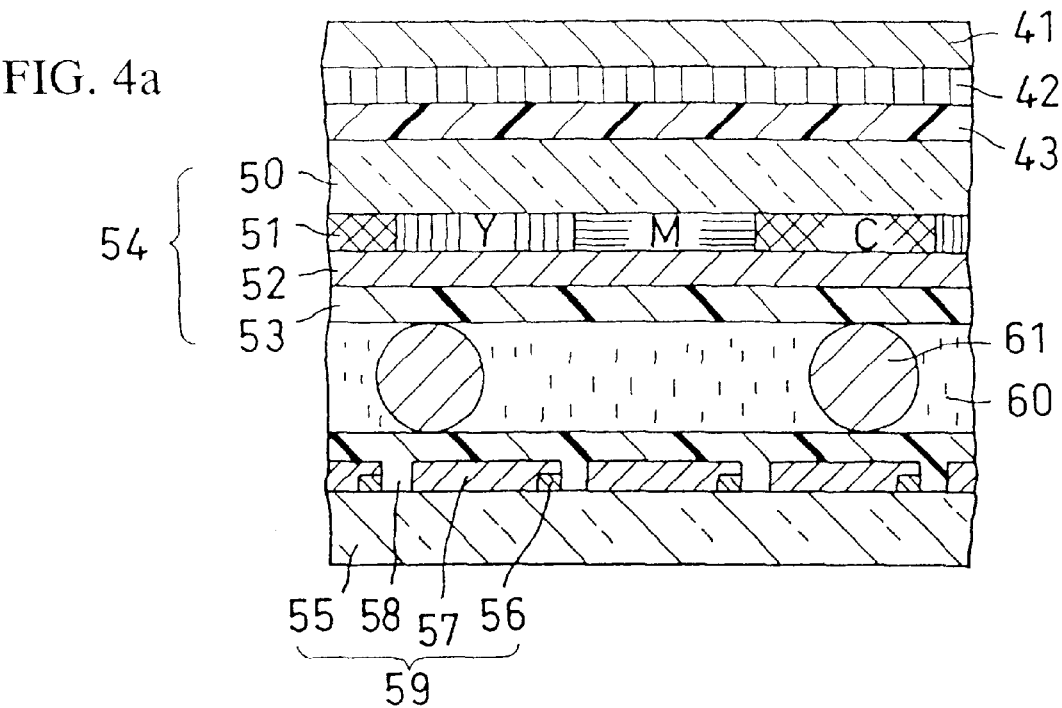
FIG. 4a through FIG. 4c are diagrams illustrating a second embodiment of the present invention.

FIG. 4 shows this actual configuration. In FIG. 4a, elliptical polarizing plate 41, high molecular liquid crystal diffraction grating 42, which forms a light diffusion layer, and orientation film 43 are laminated on the observer side (front side) of reflecting type crystal cell 40, which has a reflecting electrode possessing a reflecting surface.

Figure 4B:
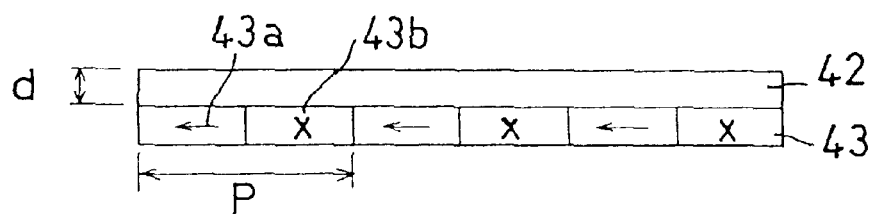
Figure 4C:
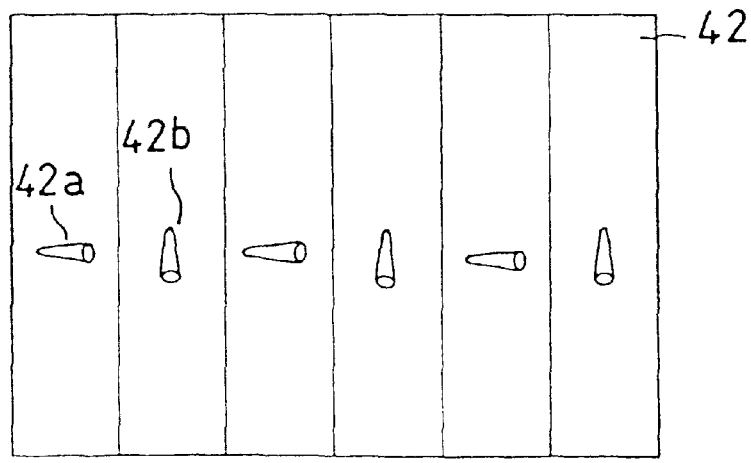

Diffraction grating layer 42, as shown in FIG. 4b is formed from an ultra violet ray cured type high molecular liquid crystal, that is to say, UV-curable liquid crystal (UVLC-C, manufactured by DIC) of thickness d (1.83 $\mu$m). Next, as an orientation film, polyimide is printed and baked on the effective display domain of substrate 50 of cell 40 to form a stripe pattern of pitch p of several tens of $\mu$m or less, as in FIG. 4b and FIG. 4c, with rubbing directions 43a and 43b orthogonal to each other in neighbouring stripes. By this means, liquid crystal molecules 42a and 42b are arranged orthogonally and are fixed by curing with UV irradiation. At this time, if Δn of the liquid crystal is, for example, Δn=0.15, and visible light domain central wave length λ=550 nm is introduced to the condition Δnd=λ/2, then d=1.83 $\mu$m. By forming it in this way, as the Δn value between the neighbouring striped spaces is the same liquid crystal, wavelength dispersion vanishes.

Also, primary diffraction angle θ is provided by the following formula.

$$\theta=\sin^{-1}(\lambda/p)$$

Here, p is the pitch, λ is the wavelength (=550 nm).

For example, if pitch p=10 $\mu$m, then the transient diffraction angle θ is approximately 3.2°, which provides sufficient diffusion.

On the other hand, counter substrate 54 is formed as follows. Color filter 51 of yellow Y, magenta M and cyan C is formed on substrate 50 made of 0.7 mm thick glass. On top of this, counter electrode 52 is formed of ITO film 2000A thick. Furthermore, as orientation film 53, polyimide (AL-1051, manufactured by Nippon Synthetic Rubber K.K.) is printed and baked on the effective display domain, and is then rubbed.

Next, aluminum picture element electrode 57, having a gate line electrode, signal line electrode, auxiliary capacitance Cs electrode (not illustrated), TFT device 56 and a speculum reflecting surface, is formed on substrate 55 made of 0.7 mm thick glass. Moreover, polyimide (AL-1051, manufactured by Nippon Synthetic Rubber K.K.) is printed and baked on the effective display domain as orientation film 58, and is rubbed in a direction orientated 60° opposite to counter electrode 54, thus forming matrix array substrate 59. Then this substrate 59 and counter substrate 54 are held maintained at a gap of, for example 3 $\mu$m, by spacer 61, and into this space liquid crystal (ZLI1695 manufactured by Merck Japan K.K.) with 0.07 wt. % added chiral material (S811, manufactured by Merck Japan K.K.) is injected. In this way, drive liquid crystal layer 60 is obtained.

At this time, it is desirable that the drive liquid crystal layer 60 is formed so that a one-quarter wavelength phase difference is obtained on a one-way optical path.

In this way, with the second actual configuration of the present invention, for example, an 800×600 dot, 11.3-inch type liquid crystal display device is formed.

When using this actual configuration, wavelength dispersion at the light diffusion layer does not occur and there is no coloring when observed over a wide visual field, thus considerably improving visibility. Furthermore, as it has a reflecting electrode, light does not pass through the substrate at the rear of the cell located to the rear as seem from the observation side, and there is therefore no resultant parallax and no ghosting effect on the screen.

As with the first actual configuration, the results of the measured chromaticity of the cell are shown in FIG. 6 and Table 1. From B0, B30, B60 of FIG. 6, as with the first embodiment, it can be clearly understood that there is no coloring from any angle.

[Embodiment 3]

Figure 5B:
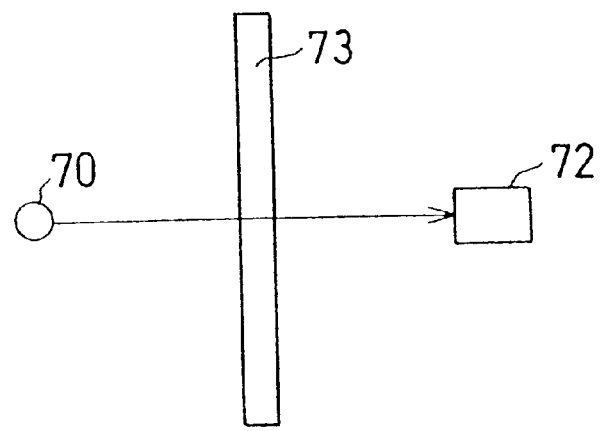

A sample was produced in which the conventional light diffusion plate stated in the first actual configuration and a blue color system polarizing plate, which has a chromaticity of (a*, b*)=(−10.4, −15) when parallel-arrayed, were laminated to the same cell as that of the first actual configuration, so as to be of the construction in FIG. 1. FIG.5b shows the chromaticity measurement system for parallel polarizing plates and light diffusion plates. Samples of these are perpendicularly arranged between light source 70 and luminance meter 72.

The liquid crystal display device of this actual configuration uses more than 1 (substantially, 2) polarizers, and when the refractive index of the refractive index medium of the light diffusion layer is $$|nA(400)-nB(400)|\geq|nA(700)-nB(700)|,$$

the chromaticity when 2 polarizers are parallel-arranged is a*<0, b* ≦0, and when $$|nA(400)-nB(400)|\geq|nA(700)-nB(700)|,$$

the chromaticity of the 2 parallel-arranged polarizers is a*>0, b* ≧0.

As explained in the aforementioned embodiment, because the refractive index difference of the composition materials of conventional light diffusion plates is the same size as the short wavelength, the shorter the wavelength of the incident light, the more strongly it is diffused. Therefore, in the neighbourhood of the regular reflection direction of the light source, the intensity of light of a wavelength which has a long wavelength with weak diffusion becomes stronger, and the intensity of light of a short wavelength with strong diffusion, weaker.

Figure 5C:
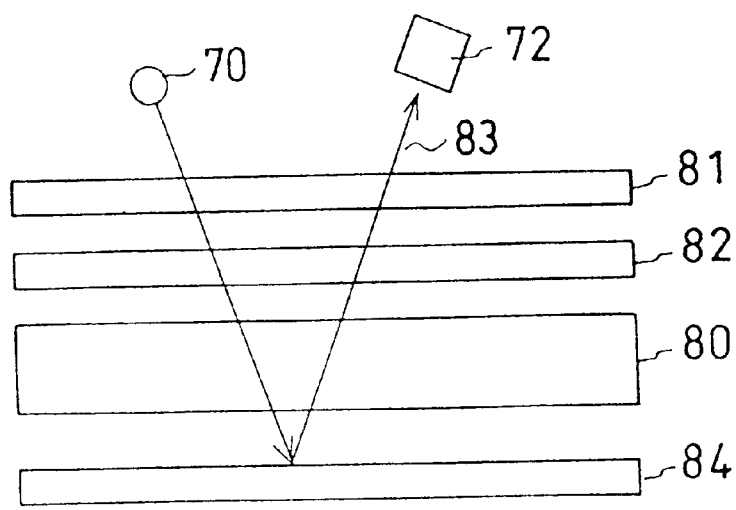

The measurement results by the measurement system of FIG. 5c of the chromaticity of light diffusing plates used in this actual configuration are shown in Table 1 and FIG. 6. As shown in FIG. 5b, the measurement of the chromaticity of the light diffusion plates was the measurement of the chromaticity of perpendicular incident light advancing in a linear direction to sample 73, and is a measurement of diffusion plate chromaticity characteristics when observed from the direction enabling bright visibility of the cell, that is to say, near the regular reflection. The results, as shown by the (E) values, are that the chromaticity of the diffusion plate is yellow.

In regard to this, the chromaticity (See Table 1 and FIG. 6) (E) of the polarizing plates used is the chromaticity located in point symmetry centering on diffusion plate chromaticity (F) values and coordinates a*, b* as the origin. Accordingly, the combined chromaticity of both mutually cancels out the coloring of each, producing almost achromatic color.

In this way, the coloring of the cell resulting from wavelength dispersion of the refractive index of the light diffusion plates can be cancelled by using a polarizing plate having coloring which is a complementary color to this coloring. When using film related to the complementary color to the diffusion plate coloring, or using a color filter, the coloring resulting from the wavelength dispersion of the refractive index of the light diffusion plate can be cancelled both by forming a relationship of the complementary color to the coloring of the diffusion plate with the mean transmittance of this color filter, and by forming a relationship the complementary color to the coloring of the diffusion plate with the coloring of the reflecting plate. However, in this case, it is not practical as the overall transmittance is reduced.

In regard to this, in the case of cancelling coloring by the color of the polarizing plates, as with this actual configuration, in terms of an achromatic polarizing plate, as this can be achieved by raising the transmittance for light of the wavelength domain that relates to the supplementary color to the diffusion plate coloring. Thus, compared to conventional constructions, there is no sacrifice of the brightness.

Furthermore, the chromaticity of polarizing plates in the case where 2 polarizing plates are arranged in parallel, is determined by the transmittance. In this actual configuration, from the cell construction standpoint, only 1 polarizing plate is used. However, as shown in FIG. 5c, in the reflecting type liquid crystal display device, the reciprocation of light entering and exiting cell 80 forms an optical path passing twice through polarizing plate 81 and light diffusion plate 82. In a construction to obtain a white display, the polarized light that finally enters polarizing plate 81 will pass through the polarizing plate. Therefore, in order to compensate for the coloring of the aforesaid light diffusion plate (even with reflecting types with a single polarizing plate construction), it follows that it is necessary to determine this by the transmittance of the case where 2 polarizing plates are arranged in parallel. Furthermore, reference numeral 84 indicates a reflecting plate.

The cell chromaticity measurement results of the liquid crystal cell of this actual configuration obtained in this way, as with the first actual configuration, are shown in FIG. 6 and Table 1. As can be clearly seem from C0, C30, C60 of FIG. 6, as with the first actual configuration, it can be understood that there is no coloring from any angle.

In the aforementioned actual configuration, a TN mode of a single polarizing plate was used, however, the same results can be obtained from an STN mode formed from a simple matrix, and a GH (Guest Host) mode. Also, color display is possible by attaching an RGB color filter. Moreover, a color display with a high color purity is possible by using a high purity YMC (Yellow, Magenta, Cyan) color filter.

According to the present invention, an achromatic display with no coloring can be obtained, and a liquid crystal display device that does not produce clouding when a color filter is used, and which has good visibility can be realized.

What is claimed is:

1. A reflecting type liquid crystal display device comprising:

two substrates, a liquid crystal layer inserted between the substrates, a reflecting surface which reflects light passing through this liquid crystal layer, and a light diffusion layer which at least diffuses the light reflected by the said reflecting surface, wherein said light diffusion layer is formed of 2 types of refractive index medium with differing refractive indices, and when the refractive index of the first refractive index medium is nA(400) at light wave length 400 nm, and nA(700) at light wave length 700 nm, and the refractive index of the second refractive index medium is nB(400) at light wave length 400 nm, and nB(700) at light wave length 700 nm, then, $$(nA(400)/nA(700)) \times 0.9 \leq (nB(400)/nB(700)) \leq (nA(400)/nA(700)) \times 1.1.$$

2. The reflecting type liquid crystal display device, as stated in claim 1, wherein the light diffusion layer is a fine particle dispersion layer in which fine particles of the second refractive index medium are dispersed in the first refractive index medium.

3. The reflecting type liquid crystal display device, as stated in claim 1, wherein the light diffusion layer is a diffraction grating layer which is the first refractive index medium and the second refractive index medium alternately arranged having regularity in a surface direction.

4. The liquid crystal display device of claim 1, wherein said reflecting surface is flat, and a light diffusion layer is provided on the light incidence side of the reflecting surface.

5. The liquid crystal display device, as stated in claim 1 or claim 4, wherein said reflecting layer is located at the observation side than the substrate located at the rear side.

* * * * *